United States Patent
Tanger et al.

(10) Patent No.: US 9,665,967 B2
(45) Date of Patent: May 30, 2017

(54) DISPARITY MAP GENERATION INCLUDING RELIABILITY ESTIMATION

(71) Applicant: Fraunhofer-Gesellschaft zur Foerderung der angewandten Forschung e.V., Munich (DE)

(72) Inventors: Ralf Tanger, Berlin (DE); Marcus Mueller, Berlin (DE); Nicola Michael Gutberlet, Berlin (DE); Peter Kauff, Berlin (DE)

(73) Assignee: FRAUNHOFER-GESELLSCHAFT ZUR FOERDERUNG DER ANGEWANDTEN FORSCHUNG E.V., Munich (DE)

(*) Notice: Subject to any disclaimer, the term of this patent is extended or adjusted under 35 U.S.C. 154(b) by 338 days.

(21) Appl. No.: 14/287,259

(22) Filed: May 27, 2014

(65) Prior Publication Data

US 2014/0267245 A1 Sep. 18, 2014

Related U.S. Application Data

(63) Continuation of application No. PCT/EP2012/074094, filed on Nov. 30, 2012.

(60) Provisional application No. 61/565,000, filed on Nov. 30, 2011.

(51) Int. Cl.
| | |
|---|---|
| *G06K 9/00* | (2006.01) |
| *H04N 7/14* | (2006.01) |
| *G06T 15/00* | (2011.01) |
| *G06T 7/593* | (2017.01) |

(52) U.S. Cl.
CPC .............. *G06T 15/00* (2013.01); *G06T 7/596* (2017.01); *G06T 2207/10012* (2013.01); *G06T 2207/20088* (2013.01); *G06T 2207/20228* (2013.01)

(58) Field of Classification Search
USPC .................................. 382/154; 348/E13.004
See application file for complete search history.

(56) References Cited

U.S. PATENT DOCUMENTS

| | | | | |
|---|---|---|---|---|
| 2002/0106120 | A1* | 8/2002 | Brandenburg | G06K 9/209 382/154 |
| 2003/0198377 | A1* | 10/2003 | Ng | G06K 9/20 382/154 |
| 2003/0198378 | A1* | 10/2003 | Ng | G06K 9/20 382/154 |
| 2012/0063669 | A1* | 3/2012 | Hong | G06T 7/593 382/154 |

(Continued)

OTHER PUBLICATIONS

Official Communication issued in International Patent Application No. PCT/EP2012/074094, mailed on Apr. 19, 2013.

(Continued)

*Primary Examiner* — Kathleen Y Dulaney
(74) *Attorney, Agent, or Firm* — Keating & Bennett, LLP

(57) ABSTRACT

A better basis for a further processing such as virtual view rendering, in form of a disparity map is achieved. To this end, the disparity map generation is done in two separate steps, namely the generation of two depth/disparity map estimates based on two different pairs of views of the scene in a manner independent from each other, with then comparing both depth/disparity map estimates so as to obtain a reliability measure for one or both of the depth/disparity map estimates.

17 Claims, 8 Drawing Sheets

(56) References Cited

U.S. PATENT DOCUMENTS

2012/0321172 A1* 12/2012 Jachalsky ............. G06T 7/0075
 382/154
2013/0129194 A1* 5/2013 Gusis ........................ G06T 5/50
 382/154

OTHER PUBLICATIONS

Tanger et al., "Trinocular Depth Acquisition", SMPTE—Motion Imaging Journal, Society of Motion Picture and Television Engineers, vol. 116, No. 5, May 1, 2007, pp. 206-211.
Mueller et al., "Spatio-Temporal Consistent Depth Maps From Multi-View Video", IEEE, 3DTV Conference: The True Vision—Capture, Transmission and Display of 3D Video, May 16, 2011, 4 pages.

* cited by examiner

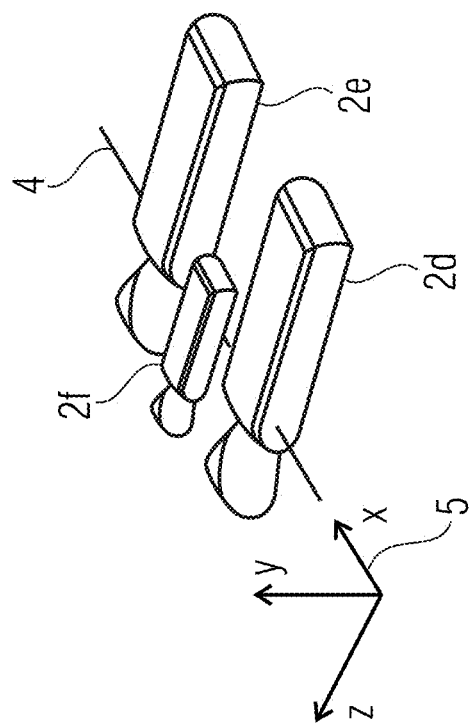
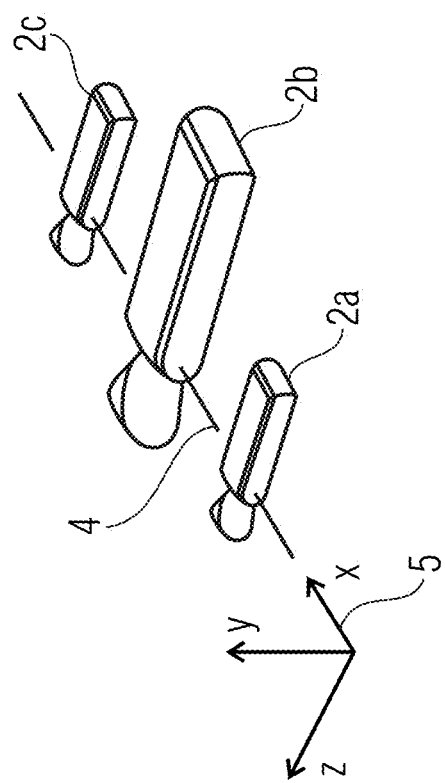

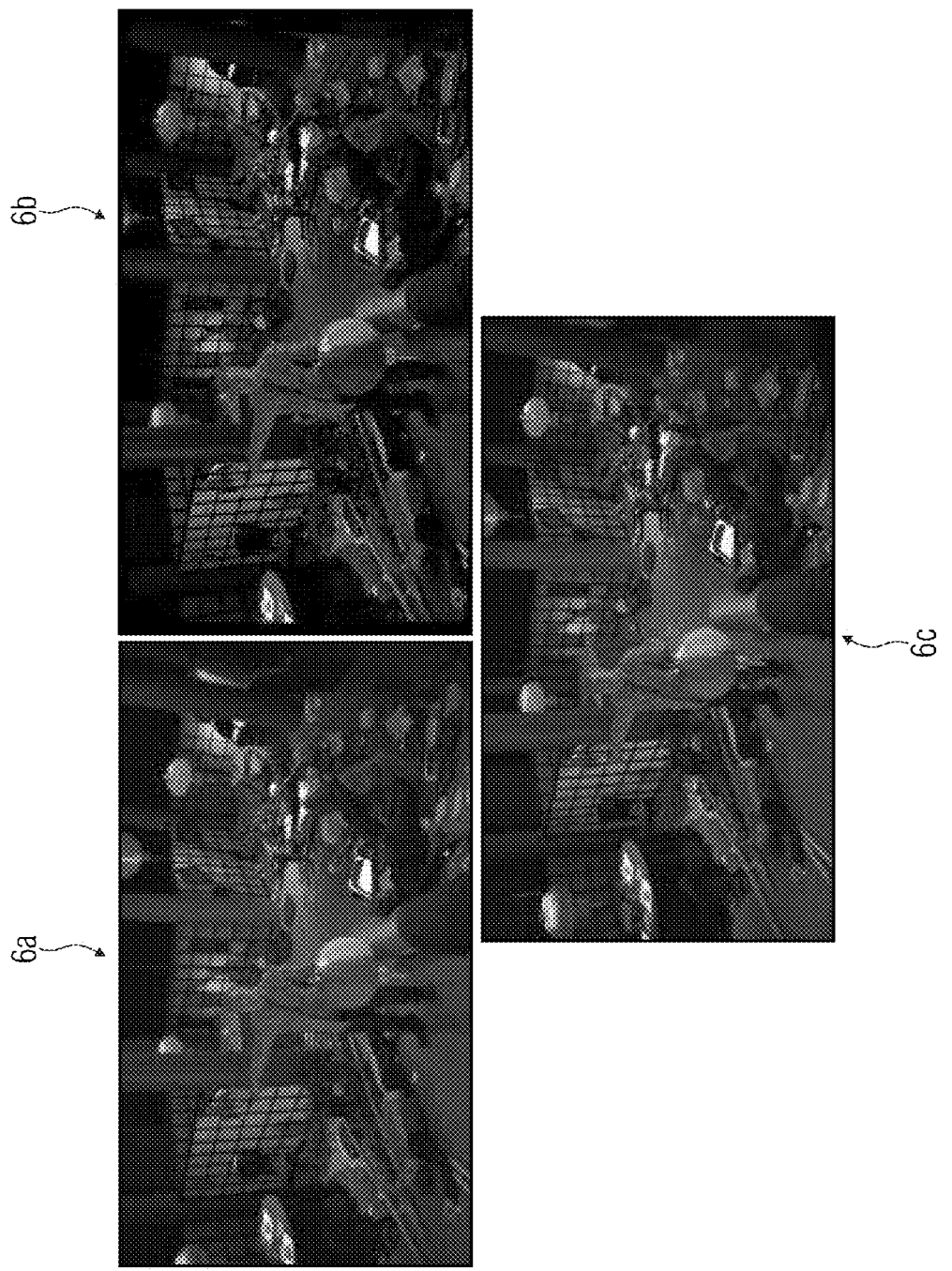

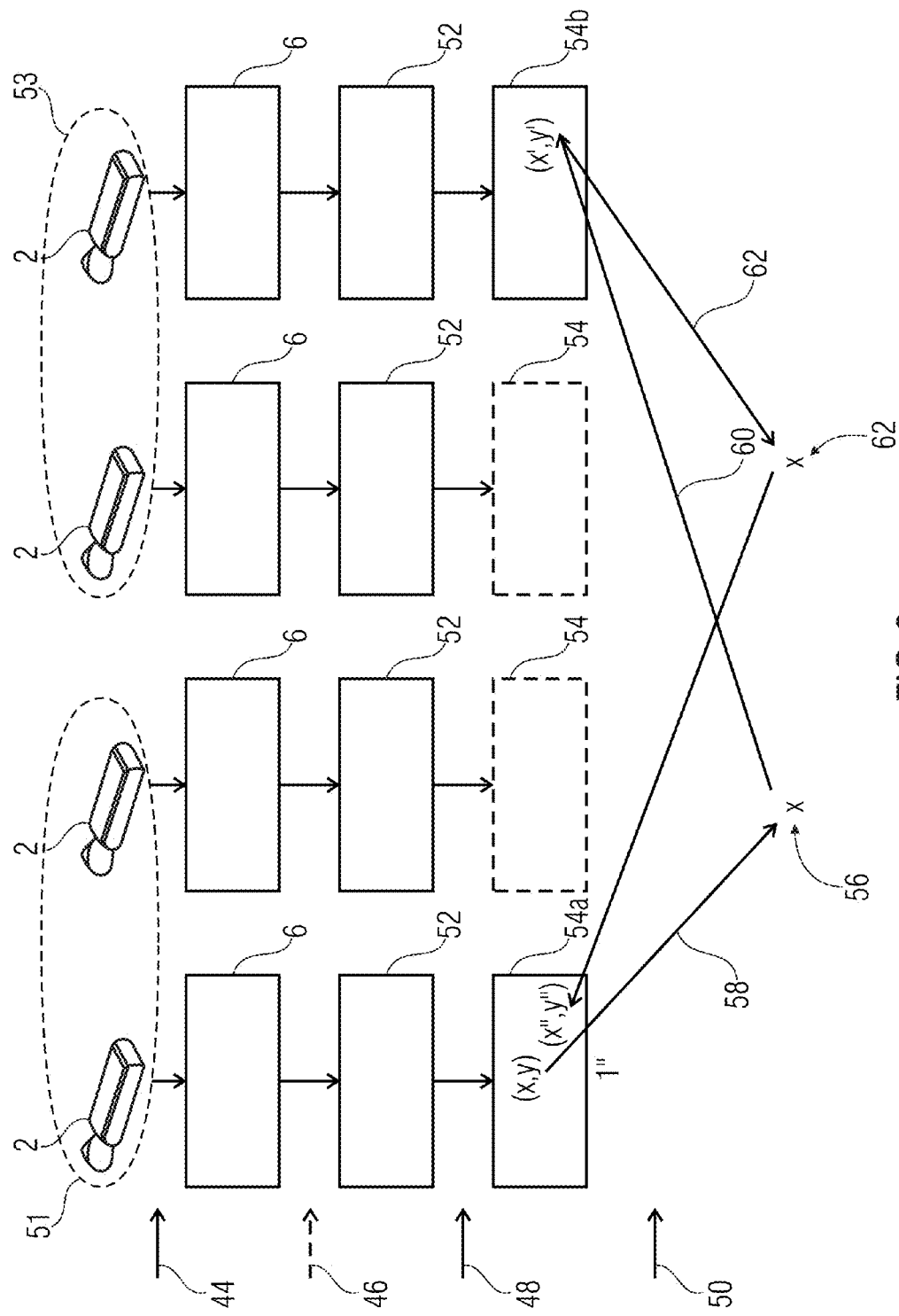

DISPARITY MAP GENERATION INCLUDING RELIABILITY ESTIMATION

CROSS-REFERENCE TO RELATED APPLICATIONS

This application is a continuation of copending International Application No. PCT/EP2012/074094, filed Nov. 30, 2012, which is incorporated herein by reference in its entirety, and additionally claims priority from U.S. Application No. 61/565,000, filed Nov. 30, 2011, which is also incorporated herein by reference in its entirety.

BACKGROUND OF THE INVENTION

The present invention relates to disparity map generation and its use in, for example, virtual view rendering.

Disparity estimation (i.e. finding correspondences in image pairs showing the same content from different perspectives) is a very active research topic in computer vision since years. With the advent of 3D cinema, 3D television and auto-stereoscopic 3D displays the meaning of robust and reliable disparity estimation increases significantly. In particular, for depth-based 3D post-production and for auto-stereoscopic multi-view 3D displays it is extremely important to generate reliable disparity maps that allow for robust rendering of virtual views from stereoscopic or even multi-view content. On the other hand the accuracy of disparity maps still depends on the suitability of the content since e.g. un-textured areas, repetitive patterns or occluded image parts usually cannot be estimated reliably.

When using disparity maps to render new virtual views, it is not necessitated to provide a completely accurate map but one, which is smooth and consistent with the image content. Recently, widely used and intensively researched bilateral, cross-bilateral and cross-trilateral filters often lead to exactly those smooth maps, which can be used for visually pleasant rendering of virtual views by using Depth Image Based Rendering (DIBR). On the other hand, to successfully use such a filter the disparity map should either contain only reliable results or should provide a reliability measure along with all estimates.

Several techniques for acquiring disparity maps usable for rendering of virtual views by exploiting stereo matching algorithms are known.

For example, the usage of more than two cameras to improve the results of disparity estimation is a common approach, which can be found in literature as well as in many patents. However, many approaches use the additional information in an implicit manner, meaning that the disparity-estimation is enhanced to directly take the additional information into account and use it to optimize the estimation results. On the other hand, using the information in an explicit manner, i.e. keeping the individual stereo disparity estimations independent and using the different results in a dedicated post-processing step is not very common.

Already in 1996 Kanade et al. [1] described a system with a reference camera and several inspection cameras. Point correspondences between the reference camera and an inspection camera are searched along corresponding epipolar lines. Finally the best match is found by optimizing over all camera pairs therefore using an implicit method. Very similar ideas can be found in a US patent application by G. Q. Chen [2]. In "Trinocular Stereo: A Real-Time Algorithm and its Evaluation" [3] Mulligan et al. also describe the usage of the trifocal constraint in an implicit manner.

In their patent "System for combining multiple disparity maps" [4] Jones and Hansard also use an explicit method to compute consistencies and reliability from multiple independent disparity estimations. However, their technique is restricted to setups, where all cameras are on a common baseline. Furthermore, the described optimization procedure focuses on finding a parameterization to transform the disparity maps in a way that a single representation can be found by e.g. averaging the different estimations.

SUMMARY

According to an embodiment, a disparity map generator may have: a generator configured to generate a first depth/disparity map estimate between a first pair of views of a scene and a second depth/disparity map estimate between a second pair of views of this scene, with the generation of the first depth/disparity map estimate and the second depth/disparity map estimate, respectively, being independent from each other and the first and second pair of views being different from each other; and comparator configured to compare the first depth/disparity map estimate and the second depth/disparity map estimate so as to obtain a reliability measure for the first depth/disparity map estimate and/or the second depth/disparity map estimate.

According to another embodiment, a system may have: an inventive disparity map generator; a DIBR renderer configured to use the first and/or second depth/disparity map estimate along with the reliability measure thereof, to render a virtual view.

According to another embodiment, a disparity map generation method may have the steps of: generating a first depth/disparity map estimate between a first pair of views of a scene and a second depth/disparity map estimate between a second pair of views of this scene, with the generation of the first depth/disparity map estimate and the second depth/disparity map estimate, respectively, being independent from each other and the first and second pair of views being different from each other; and comparing the first depth/disparity map estimate and the second depth/disparity map estimate so as to obtain a reliability measure for the first depth/disparity map estimate and/or the second depth/disparity map estimate.

Another embodiment may have a computer program having a program code for performing, when running on a computer, an inventive method.

The present invention is based on the finding that a better basis for a further processing such as virtual view rendering, in form of a disparity map may be achieved if the disparity map generation is done in two separate steps, namely the generation of two depth/disparity map estimates based on two different pairs of views of the scene in a manner independent from each other, with then comparing both depth/disparity map estimates so as to obtain a reliability measure for one or both of the depth/disparity map estimates.

BRIEF DESCRIPTION OF THE DRAWINGS

Embodiments of the present invention will be detailed subsequently referring to the appended drawings, in which:

FIG. 1a,b show setups with three cameras, namely a) with all cameras on a common baseline, b) with two cameras on a common baseline and a third camera on top, FIG. 2 shows a left, center and right camera view of the three camera setup in FIG. 1a, FIG. 3 shows disparity maps filtered by a reliability measure for the central view using the camera images from FIG. 2, FIG. 8 shows a schematic illustrating the process of FIG. 7 and, in particular, the depth/disparity estimate comparison.

DETAILED DESCRIPTION OF THE INVENTION

Figure 3:
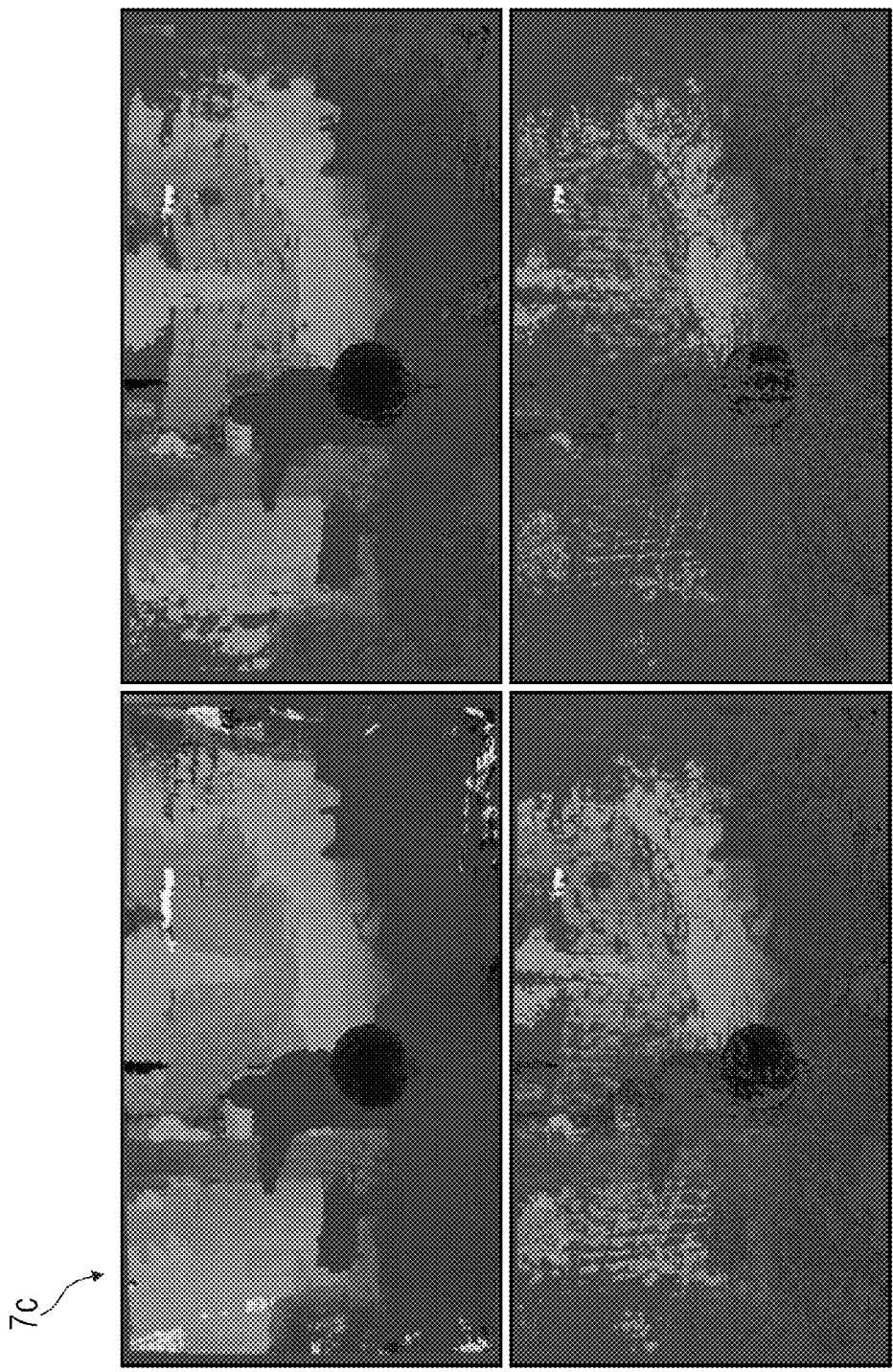

In the following, several embodiments of the present application are explained in more detail. Firstly, an embodiment using three cameras/views is described in detail so as to representatively describe the characteristics of the disparity estimation generation on accordance with embodiments of the present invention and present examples for reliability measures. Thereinafter, other possible camera setups are described. Then, a disparity map generator in accordance with an embodiment is described in more generic terms. Finally, the functionality of the disparity map generator in accordance with an embodiment is again described using a flowchart.

As will turn-out from the following discussion, the below-outlined embodiments exploit the results of multiple independent disparity estimations on image pairs to generate reliability measures which can be used to drive filtering techniques, e.g. based on bilateral filtering approaches, for generating dense pixel-by-pixel disparity maps which then can be used to render new virtual views.

FIG. 1a and FIG. 1b show possible three-camera setups in connection with which the next embodiment for disparity map generation is described. FIG. 1a shows three cameras 2a, 2b and 2c, all of which are arranged along a common baseline 4 which is exemplarily oriented along an x-axis of a global (world) coordinate system 5. The z-axis of coordinate system 5 exemplarily points in parallel to the optical axis of cameras 2a, 2b and 2c or points, at least, into the direction of this scene commonly captured by cameras 2a-2c. Naturally, it might be that the cameras 2a,2b,2c slightly deviate from an ideal positioning along the base line 4 such as, for example, due to mechanical clearances or the like.

FIG. 1b also shows a three camera setup. Here, however, two cameras 2d and 2e are arranged among the common baseline, whereas the third camera 2f is offset from the baseline 4 in the other transverse direction y.

That is, to use the embodiment described next with a three camera system, all cameras can either be mounted on a single baseline (FIG. 1a) or two cameras 2d, 2e can be mounted on a joint baseline and a third camera 2f on top (FIG. 1b), but, for example, positioned in between. In the first case, the cameras are positioned sequentially distributed along the baseline. Thus, camera 2a forms a "left" view, camera 2b a "center" view and camera 2c a "right" view. In the second case, the cameras are also arranged with camera 2f being offset relative to the base of the others so that camera 2d forms a "left" view, camera 2e forms a "right" view and camera 2f forms a "top" view.

In FIG. 1a,b the cameras 2a-2f are illustratively shown to be different in size. This is to illustrate that the cameras may differ from each other such as, for example, in spatial resolution or the like. For example, the big cameras 2b,d,e may depict high quality cameras and the small cameras 2a,c,f lower-quality ones with potentially reduced quality but, in general, also cameras of identical quality can be used. Note that these three-camera setups are just examples. In principle, the three cameras can form any arbitrary triangle in the 3D space as long as they capture the same image content from different perspectives. Furthermore, any combination of cameras with high and reduced quality can be used.

In a first step the system is calibrated to acquire extrinsic calibration parameters. This calibration can either be done using pattern-based approaches or using feature-point based technologies not relying on a known pattern.

In a second step the camera pairs to be used for the independent disparity estimation are selected. To ease the matching procedure, each pair is rectified to assure that correspondences are on the same scan line in the rectified images. The more rectified camera pairs are used the higher is the achievable quality of the reliability measure. For the setup from FIG. 1a typically the "left/center" and "center/right" pairs, i.e. 2a,b and 2b,c are used, for the setup from FIG. 1b all three possible pairs, i.e. 2d,f and 2f,e and 2d,e. Note that rectification is not mandatory.

In case of non-rectified images matching can also be done along arbitrary oriented epipolar lines, but rectification eases the whole process significantly. Therefore, for simplicity reasons, the following explanations assume that the image pairs have been rectified before applying the disparity estimate.

In a third step, two different disparity estimations are carried out for each selected camera pair from step two. An estimate which provides different results depending on which camera is used as "base" camera and as "reference" camera is advantageous. If the left camera delivers the base view, we call the estimation "left-to-right" (LR) estimation, and, vice versa, if the right camera provides the base view, we call it "right-to-left" (RL) estimation. In our applications we use the Hybrid Recursive Matcher (HRM), which is perfectly suited to this approach since due to the different selectable search directions, e.g. starting from the top-left part of the images and going to bottom-right for the LR estimation and starting from bottom-right and going to top-left for the RL estimation, estimation results for LR and RL estimation tend to be different, in particular in unreliable regions. However, any other estimate that has similar features can be taken as well.

In a fourth step, a first reliability measure called the left-to-right reliability (LR-reliability, $R_{LR}$) can be calculated as follows: let $D_{lr}(x,y)$ be the estimated disparity at column x and row y in the LR-estimation and $D_{rl}(x,y)$ be the estimated disparity at column x and row y in the RL estimation. Still assuming that we have rectified images and therefore disparities only have an x-component, we can compute the LR-reliability at position (x,y) as follows where small values indicate high reliability:

$$R_{LR}(x,y)=|D_{rl}(x+D_{lr}(x,y),y)+D_{lr}(x,y)|$$

In case of un-rectified images where $D_{lr}(x,y)$ and $D_{rl}(x,y)$ are 2D vectors and |(x,y)| describes a norm of a 2D vector LR-reliability is calculated as follows:

$$R_{LR}(x,y)=|D_{rl}(x+D_{lr}(x,y)x,y)+D_{lr}(x,y)y)+D_{lr}(x,y)|$$

Please note that the quality of LR-reliability is higher the less correlated the LR and RL estimations are.

In a fifth step, estimations from different camera pairs are compared using the trifocal constraint. For the setup described in FIG. 1a, let camera pair 1 be composed using rectified left and center camera and let camera pair 2 consist of rectified center and right camera. Then, the disparity of the RL-estimation for the center camera in pair 1 is denoted $D_{1rl}$ and, accordingly, the disparity of LR-estimation for the (same) center camera in pair 2 is indicated as $D_{2rl}$. Note that the rectified images of the center camera in pair 1 and pair 2 are not identical because the original image from the center camera has been rectified differently for pair 1 and 2, respectively.

For all pixels $(x_{1rl}, y_{1rl})$ of the RL-estimation of rectified image pair 1 the corresponding point in 3D space can be computed by using the extrinsic camera parameters from step 1, the rectification parameters (also implicitly given by calibration) and the corresponding disparity $D_{1rl}(x_{1rl}, y_{1rl})$. The point can then be projected on the rectified center image of camera pair 2 resulting in point $(x_{2lr}, y_{2lr})$. Using $D_{2rl}(x_{2lr}, y_{2lr})$ at point $(x_{2lr}, y_{2lr})$, again a point in 3D space can be computed and finally re-projected onto the rectified center image of pair 1 resulting in point $(x_{1rl\text{-}proj}, y_{1rl\text{-}proj})$. Note that this process can also be performed implicitly by warping and scaling the disparity maps $D_{1rl}(x_{1rl}, y_{1rl})$ and $D_{2rl}(x_{2lr}, y_{2lr})$ in accordance to a common reference image plane by using the rectification parameters.

The trifocal reliability for point $(x_{1rl}, y_{1rl})$ is then computed (still assuming that we have rectified image pairs and differences in y direction are zero or at least negligible in case of computational rounding errors) as follows where again small values indicate high reliability:

$$R_{Tri}(x_{1rl}, y_{1rl}) = |x_{1rl\text{-}proj} - x_{1rl}|$$

For un-rectified images where |(x,y)| describes a norm of a 2D vector trifocal reliability calculation extends to:

$$R_{Tri}(x_{1rl}, y_{1rl}) = |(x_{1rl\text{-}proj}, y_{1rl\text{-}proj}) - (x_{1rl}, y_{1rl})|$$

In case that only one reliability value is needed, $R_{LR}$ and $R_{Tri}$ can be merged by suitable weighting in a sixth step. Both reliabilities are measured in pixels and therefore can easily be combined using e.g. the minimum, the mean, a weighted mean or the maximum of both.

Please note that steps one to six as described above assume that reliabilities for the rectified image of the center camera in pair 1 should be generated. The same steps can be applied in a similar manner to generate reliabilities for the rectified images of left camera, the right camera or the center camera in pair 2. Furthermore, the reliability measures can also be recalculated for all original, un-rectified images and can also be merged by suitable weighting if same camera is used in more than one rectified camera pair (as it is the case for the central camera in the above example).

As an example, FIG. 2 shows captured images of the 3-camera set-up from FIG. 1(a). That is, image 6a is, for example, captured by camera 2a, image 6c is, for example, captured by camera 2c and image 6b is, for example, captured by camera 2b, i.e., the one positioned between the other ones 2a and 2c. Note that the central camera 2b is exemplarily the main high-quality camera in this case, whereas the two satellites 2a, 2c are smaller and of reduced quality resulting, for example, in lower contrast and brilliance in color. FIG. 3 shows disparity maps filtered by results of corresponding reliability measures for the central view using the camera images from FIG. 2. The picture at top left shows the original dense disparity map 7c. The remaining pictures visualize reliable disparity values only depending on a threshold. The threshold can be used to scale the desired reliability such that only those pixels of map 7c are visualized where the reliability-related difference values $R_{LR}$ and $R_{Tri}$ are lower than a given threshold (counted in pixels). In this sense, the picture at bottom right only shows "perfect" disparities that have survived the most restrictive threshold (e.g. $R_{LR}$ and $R_{Tri}$ are lower than 1 pixel). The other two pictures at top right and bottom left show results for less restrictive thresholds (5 and 2 pixels, resp., for example).

Figure 4A:
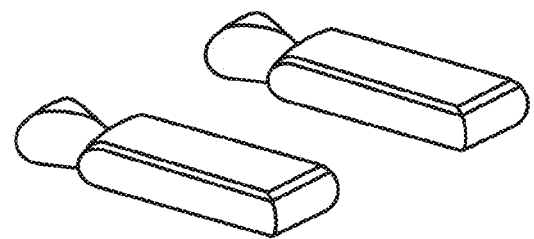
FIG. 4a shows a camera setup with two cameras.
Figure 4B:
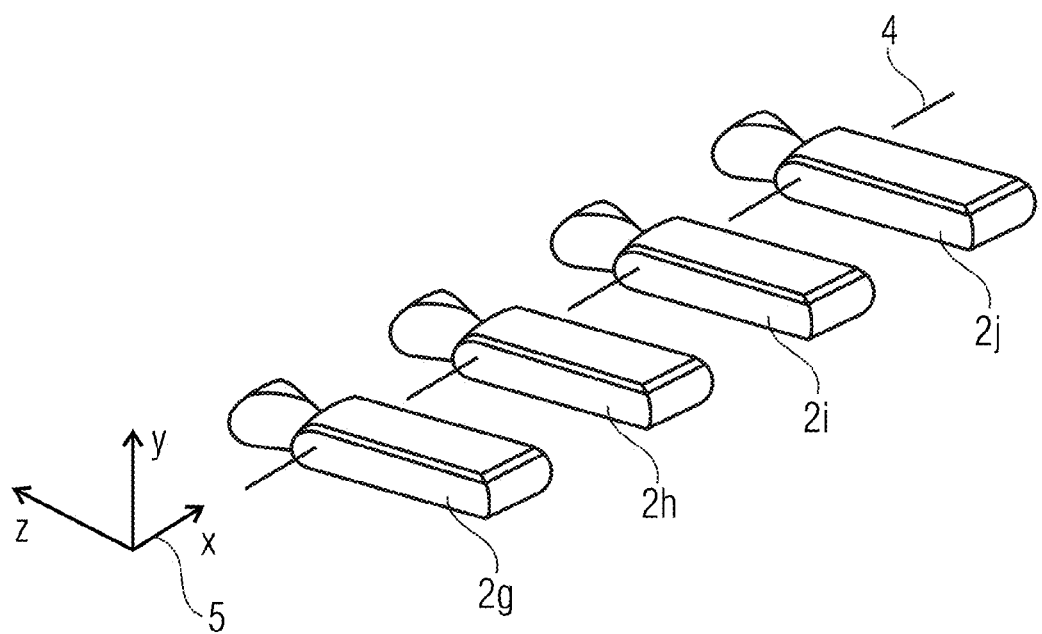
FIG. 4b shows a camera setup with four cameras, FIG. 5a,b show camera setups with satellite pairs, namely a) with one center camera and two satellite pairs, b) with center camera pair and two satellite pairs.

Some applications might need different setups with more than three cameras or material from only two cameras might be available. FIG. 4(a) shows an example setup with only two cameras. Here only steps one to three could be applied to provide at least a limited reliability measure, whereby the procedure would degenerate to a plane consistency check as in stereo matching. With a 4-camera setup as exemplarily shown in FIG. 4(b) typically the three neighboring pairs would be used and all reliabilities, including the trifocal reliability, can be computed. In particular, in accordance with the embodiment of FIG. 4b, where four cameras 2g, 2h, 2i and 2j are arranged on a common baseline, again, exemplarily shown to extend in parallel to the x-axis of coordinate system 5. Three camera pairs could be formed by pairing immediately neighboring cameras, i.e. 2g,h and 2h,i and 2i,j.

Figure 5A:
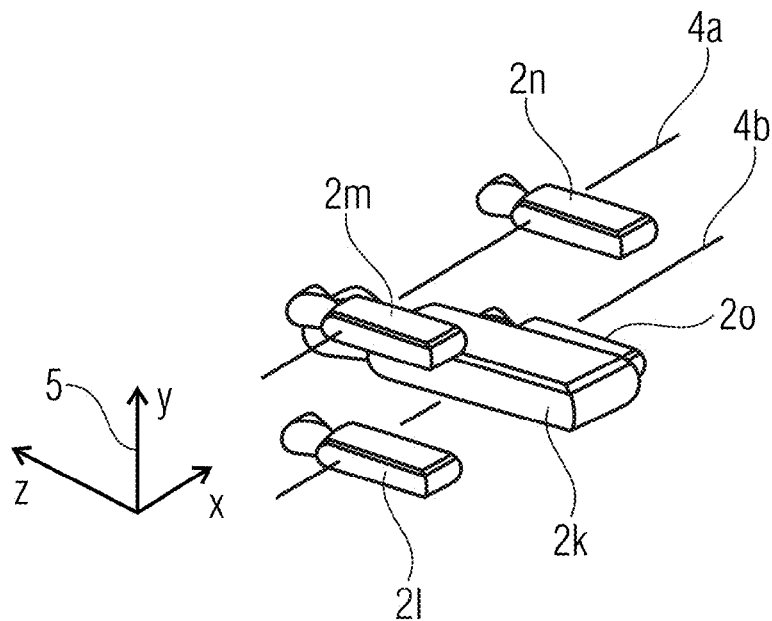
Figure 5B:
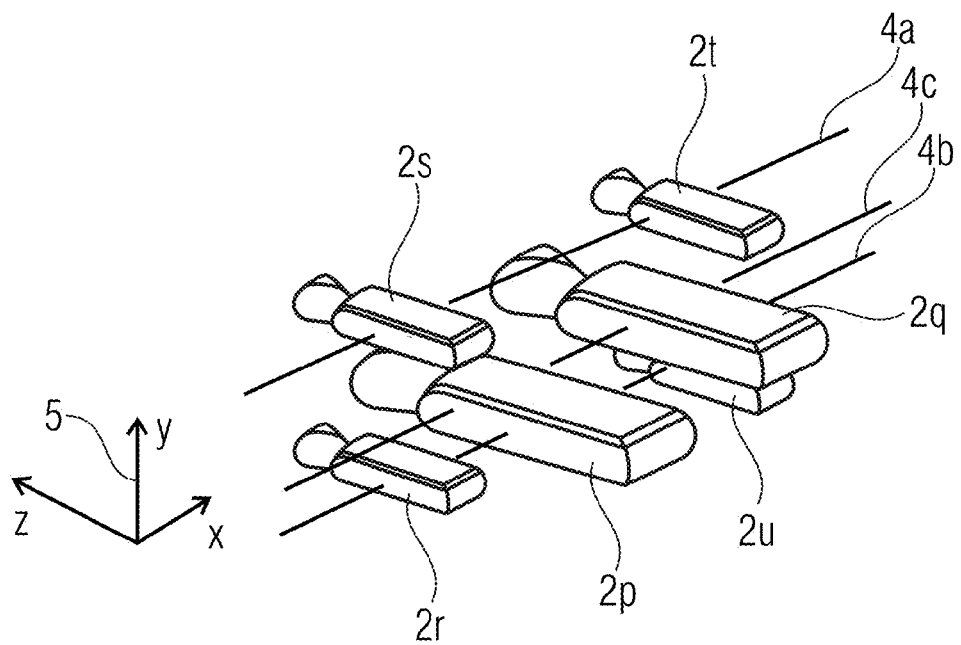

Also, multiple satellites are possible as depicted in FIGS. 5a and 5b, offering even more information and improving the quality of the reliability information. FIG. 5a, for example, shows a camera setup comprising one center camera 2k of potentially higher quality, and two pairs of cameras, namely 2m,n and 1, o, forming satellite pairs the baselines 4a and 4b of which extend in parallel to each other and, exemplarily shown in FIG. 5a, in parallel to the x-axis of coordinate system 5, and offset to each other along the y-axis with camera 2k being positioned between both baselines 4a and 4b along the y-axis and between the left cameras 2m and 2l on the one hand and the right cameras 2n and 2o on the other hand along the x-axis. As shown, the satellites 2l to 2o may exemplarily be of lower quality.

The exemplary setup of FIG. 5b differs from the setup of 5a in that a stereo pair of centralized cameras 2p and 2q is used instead of the single central camera 2k in FIG. 5a. Accordingly, satellite camera pairs of 2s,t and 2r,u have their baselines in parallel to each other and in parallel to a baseline 4c of the pair of centralized cameras 2p and 2q. In particular, central cameras 2p and 2q may be arranged such that their baseline 4c is arranged between baselines 4a and 4b along the y-axis with both cameras 2p and 2q lying between the left cameras 2s and 2r on the one hand and 2t and 2u, on the other hand, as the dimension along the y-axis is concerned. In both camera setups of FIGS. 5a and 5b, the cameras may be arranged so as to be positioned in a common plane within which the baselines 4a to 4c are positioned.

However, the general application of the embodiment outlined herein is independent from the specific camera setup. The LR-reliability $R_{LR}$ may be computed within each camera pair used for disparity estimation and the trifocal reliability $R_{Tri}$ may be computed between different camera pairs for which disparity estimation was carried out.

Figure 6:
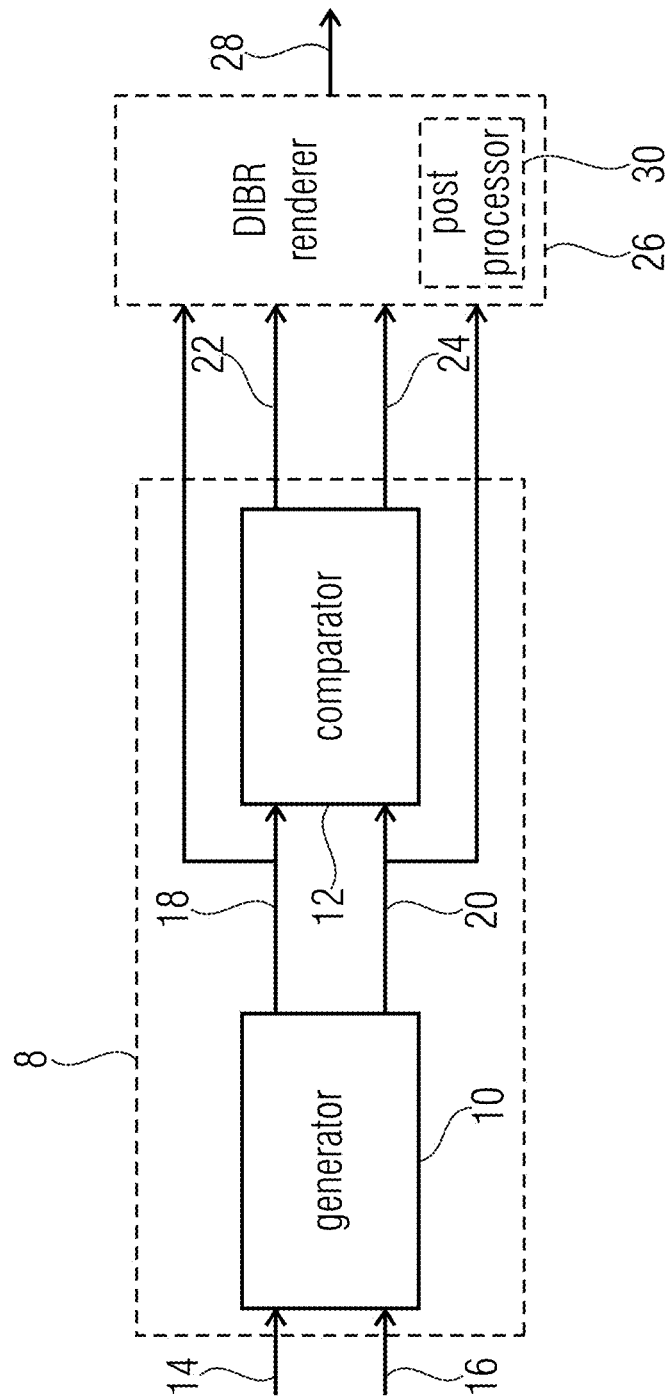
FIG. 6 shows a disparity map generator in accordance with an embodiment of the present invention and its possible integration into a rendering system along with a DIBR renderer.

Using the principles set out above, but described in more generic terms, FIG. 6 is described which shows a disparity map generator 8 comprising a generator 10 and a comparator 12. Generator 10 is configured to receive a first and a second pair of views 14, 16 of a common scene, i.e. pairs of images of the same scene but taken from different viewpoints and/or view directions. The images may have equal or different spatial resolution, bit depth or quality. Further, all images may relate to the same time stamp, although it might not be an issue in static scenes. Moreover, all views may comprise a sequence of images/pictures, using the same or different time resolution.

The generator 10 is configured to generate a first depth/disparity map estimate 18 between the first pair of views 14, and a second depth/disparity map estimate between the second pair of views 20. The generation of the first and second depth/disparity map estimates 18 and 20 are independent from each other. That is, the depth/disparity map estimate 18 does not depend on the second pair of views 16—or at least the view of the second pair not contained within the first pair of views 14—and the second depth/disparity map estimate 20 does not depend on the first pair of views 14—at least not on the view of the first pair of views 14 not contained within the second pair of views 16. The generator 10 may be configured to rectify the first and second pairs of views 16 and 18 prior to the generation of the first and second depth/disparity map estimates 18 and 20. In particular, the rectification may be performed pair-wise so that, if the pairs of views 14 and 16 have one view in common, different rectification information may be applied by generator 10 to this view in order to rectify same for the generation of the first depth/disparity map estimate 18 on the one hand, and the second depth/disparity map estimate 20, on the other hand. The generator 10 may be configured to perform the generation of the first and second depth/disparity map estimates 18 and 20 by finding corresponding portions showing the same content of the scene, but from a different perspective. Again, the finding of such mutually corresponding portions may be done in the first pair of views 14 on the one hand and in the second pair of views 16 on the other hand independently from each other. The generation of depth/disparity map estimates 18 and 20 may also involve filtering in order to remove outliers, the filtering comprising spatio and/or temporal filtering.

The generator 10 may be configured such that the first depth/disparity map estimate 18 relates to a first view comprised by the first pair of views 14, while the second depth/disparity map estimate 20 relates to a second view comprised by the second pair of views 20. For example, the first depth/disparity map estimate 18 may have a depth/disparity sample value for each sample of the image of the first view, and the second depth/disparity map estimate 20 may have a depth/disparity value for each sample of the image of the second view. However, another spatial resolution may also be feasible. As described in the above sections, the disparity may be used as a measure for the depth, but alternatively depth may be used. However, in a more generic sense, the first depth/disparity map estimate 18 and the second depth/disparity estimate 20 may represent a spatially sampled estimate of the depth/disparity of this scene relating to views other than the views comprised by the first and second pairs of views 14 and 16, respectively, such as intermediate mid views between the first pair of views 14 and the second pair of views 16, respectively.

As also became clear from the above description, although the first and the second pair of views 14 and 16 are different from each other, they may, or may not, have one view in common.

The comparator 12 is configured to compare the first depth/disparity map estimate and the second depth/disparity map estimate 20 so as to obtain a reliability measure for the first depth/disparity map estimate 18, i.e. 22 in FIG. 6, or for the second depth/disparity map estimate, i.e. 24 in FIG. 6.

As illustrated in FIG. 6, the disparity map generator 8 of FIG. 6 may be combined with a DIBR renderer 26 so as to result in a system for rendering a synthesized or virtual view 28. The DIBR renderer 26 is configured to render the virtual view from the first and/or second depth/disparity map estimate 18, 20 along with the reliability measure thereof, i.e. 22, 24. The DIBR renderer 26 is able to obtain a virtual view 28 of higher quality due to the reliability measure 22 and/or 24 with which the used depth/disparity map estimate 18 and/or 20 is accompanied with. For example, the DIBR renderer 26 may take the reliability measure 22 and/or 24 into account when fusing the virtual view 28 from two neighboring views 18 and 20, both being accompanied by respective reliability measures 22 and 24. For example, in fusing both views, DIBR renderer 26 may select portions of the virtual view 28 obtained from a view where the associated reliability is higher than compared to the other view. Similarly, DIBR renderer 26 may take the reliability measure into account when performing hole filling such as background hole filling of disocclusions in the virtual view 28.

To be more precise, and as described above, the generator 10 may be configured such that the first and second pairs of views 14 and 16 share a predetermined view, such as the center view in case of FIG. 1a, for example, with the first pair of views 14 additionally comprising, for example, the right view and the second pair of views 16 comprising, for example, the left view in addition to the center view. However, other combinations of views are also feasible, as has been shown with respect to FIG. 1b. In that case, all of these views may obey a trifocal constraint and the comparator 12 may be configured to use the trifocal constraint in the comparison.

In particular, the comparator 12 may be configured to, in comparing the first and second depth/disparity map estimates 18 and 20, warp samples of the first depth/disparity map estimate 18 and/or the second depth/disparity map estimate 20 into a common view. As described above, the common view may be one of the first and second view pairs 14 and 16, itself. For example, the generator 10 may be configured such that the first depth/disparity map estimate 18 relates to a first view comprised of the first pair of views 14, and the second depth/disparity estimate 20 may relate to a second view comprised of the second pair of views 20, and the comparator 12 may be configured such that the common view among the pairs of views 14 and 16, to which the warping takes place, is either the first view or the second view. In section 3.1, an embodiment has been presented, according to which the comparator 12 is configured to warp samples of the first depth/disparity map estimate 18 to the second view, i.e. the view to which the second depth/disparity estimate 20 relates, sample the second depth/disparity map estimate 20 at locations to which samples of the first depth/disparity map estimate 18 have been warped, re-warp the locations into the first view, i.e. the one to which the first depth/disparity map estimate 18 relates, using the second depth/disparity estimate 20 as sampled at the locations accessed by warping, and use a distance between positions of the samples of the first depth/disparity map estimate 18 and the re-warped locations as the reliability measure for the first depth/disparity map estimate. See, for example, the formulae above in section 3.1 for $R_{Tri}$.

However, generator 10 may additionally be configured to use generation schemes for generating the first and second depth/disparity maps according to which the generation is dependent on which one of the pairs of views 14 and 16, respectively, is the reference view and which one is the base view. That is, the generator 10 could be configured to additionally generate a depth/disparity map estimate for each pair of views 14 and 16, where the base and the reference view among the respective pairs of views is switched. The comparator 12 could be configured to compare the resulting pair of depth/disparity map estimates for a respective pair of views 14 and 16, respectively, so as to obtain an intra-pair reliability measure, and the comparator 12 could be configured to take this intra-pair reliability measure into account for determining the overall reliability measure. See above, for example, in section 3.1 the formulas concerning $R_{LR}$. As described above, the comparator 12 could be configured to determine the reliability measure by a sample-wise combination of the intra-pair reliability measure and the inter-pair/trifocal reliability measure as obtained by the comparison of the first depth/disparity map estimate 18 and the second depth/disparity map estimate 20. As also described above, the generator could be configured to use different imaging processing directions when generating the pairs of depth/disparity map estimates for each pair of views 14 and 16, respectively, so that the comparison of same results in a quite good estimate for the reliability of the estimation represented by these estimates. Moreover, the comparator 12 could be configured to, in comparing such a pair of depth/disparity map estimates for one pair of views 14 or 16, warp one of these depth/disparity map estimates to the view to which the other one of this pair of depth/disparity map estimates relates, with deriving the intra-pair reliability measure from a deviation of the warped depth/disparity map estimate from the other depth/disparity map estimate. Compare, for example, the formulas above in section 3.1 relating to $R_{LR}$.

As also described above, a post-processor may be configured to filter the first and/or second depth/disparity map estimate 18, 20 using the reliability measure for the same as determined by comparator 12. The post-processor may be included within DIBR renderer 26 as indicated at reference sign 30 in FIG. 6. However, the post-processor 30 may be present without the DIBR renderer 26.

For example, the post-processor 30 may filter portions of the first and/or second depth/disparity map estimate 18, 20 more intensively at portions where the reliability measure is lower than compared to other portions. Further, some portions may be highlighted as not being reliable at all. Compare, for example, the second to fourth disparity maps in FIG. 3.

Figure 7:
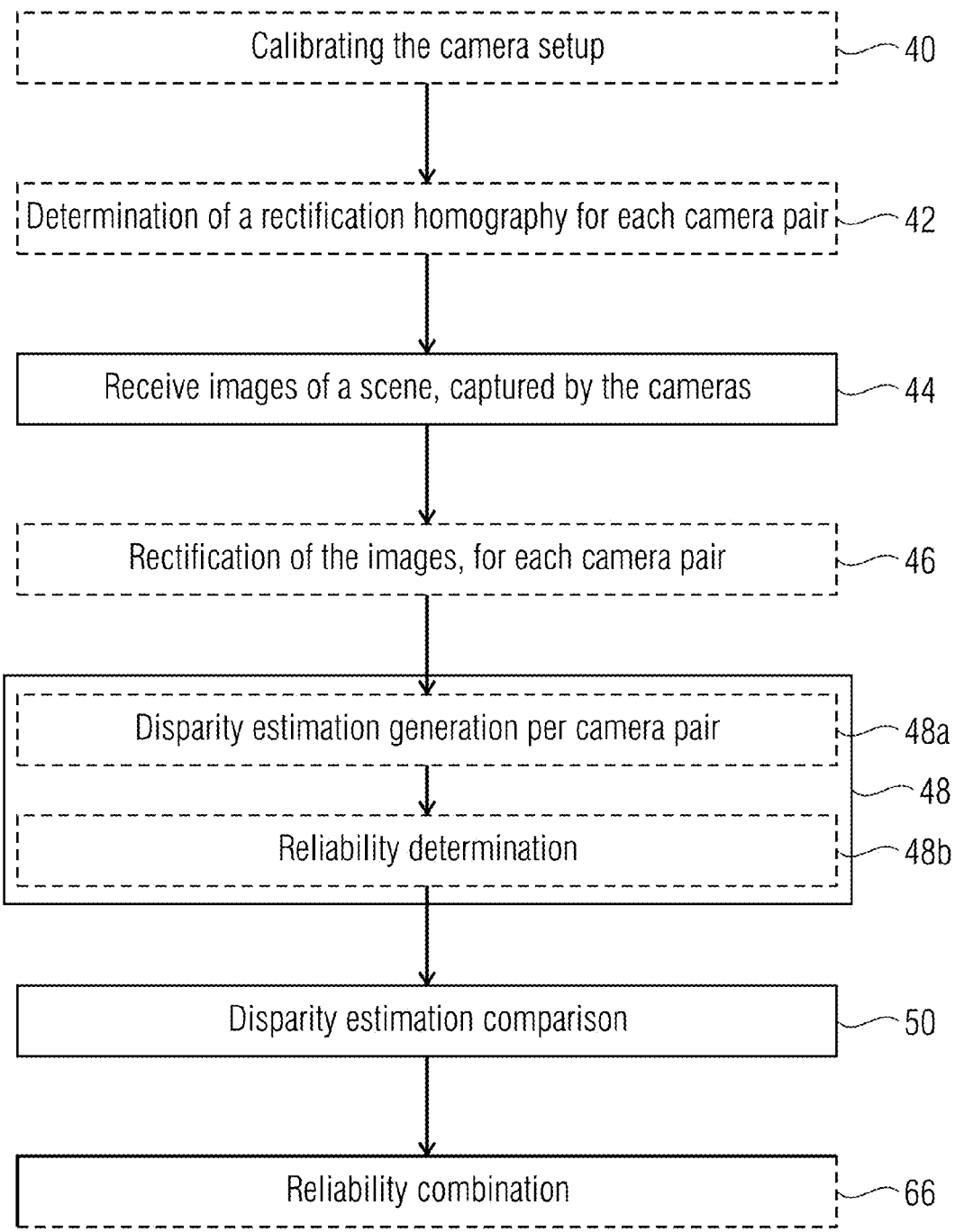
FIG. 7 shows a flow diagram of a disparity map generation in accordance with an embodiment.

FIG. 7 shows a flowchart of the steps of a disparity map generation which are performed, for example, by generator 10 of FIG. 6.

In a first optional step 40, the camera setup, comprising the cameras for capturing the images which the disparity map to be generated is based on, is calibrated. As explained above, different possibilities exist for performing calibration 40. For example, the calibration 40 may necessitate the capturing of a known scene by the camera setup or may be agnostic with respect to the scene captured. In any case, the images of the scene captured by the cameras of the camera setup are used in the calibration 40 so as to obtain the extrinsic calibration parameters for each camera of the camera setup. Extrinsic calibration parameters for a respective camera may comprise: a position of the camera center given, for example, in real world coordinates such as system 5, and a rotation and inclination of the camera's optical axis in relation to, for example, a parallel orientation of all cameras' optical axes onto the scene, i.e. the z-axis in the exemplary system 5, presented above. In general, extrinsic camera parameters define the location and orientation of the respective camera with respect to a common (real world) coordinate system common for all cameras and enable mapping the coordinates of such system 5 to camera-specific coordinates for the respective camera. As an outcome of the calibration 40, intrinsic camera parameters may also be determined per camera of the camera setup. The intrinsic camera parameters may comprise per camera, for example: a focal length or lens distortion parameters of the respective camera. The intrinsic camera parameters link the pixel coordinates of the camera-specific coordinate system with the image plane coordinates within the images of the respective camera. Altogether, calibration 40 provides projection parameters including extrinsic and, if present, intrinsic calibration parameters, enabling projecting the 3D points of the real world coordinate system 5 onto the respective camera's image plane.

In a further optional step 42, a rectification of the cameras may take place. The rectifications may be done per camera pair, and may be done so that the rectification for one camera pair is independent from the rectification of any other camera pair. As a result of the rectification, for each camera pair, a homography may be obtained for geometrically rectifying one camera of the respective camera pair to the other camera of that camera pair. The rectification may be done so that, after a rectification, the cameras of each camera pair virtually have their camera axes parallel to each other and have the pixel row direction parallel to the baseline. The parallel orientation of the optical axis needs not to be achieved. Although one homography matrix for one of the camera of the respective camera pair would be sufficient, two homography matrices could alternatively be determined for each pair, both geometrically rectifying a respective camera of the respective camera pair so that, after rectification using the respective homography matrix, both cameras are virtually registered to each other as wished. Using the rectifying homography, the images of the cameras of each camera pair may be registered to each other, i.e. transformed, so as to result in a pair of images appearing as if they were captured by perfectly registered camera pairs. As noted above, the rectification is not necessitated. Further, it should be recalled that, as the rectification 42 is done for each camera pair individually, the image of a camera of a certain camera may be the subject of different homographies for the different camera pairs which the certain camera is part of.

Then, in step 44, the images of a scene, captured by the cameras of the camera setup are received. As the camera setup does not need to be part of the generator 10, the actual capturing may not be part of the reception step 44 itself, but it may be part of step 44.

In a subsequent, optional step 46, the images received at step 44 may then be subject to the rectification. In particular, each image may be rectified once for each camera pair to which the camera which captured the respective image belongs to. As explained above, however, some of the images may be left un-rectified as potentially merely one of the cameras of each camera pair needs to be rectified in accordance with one embodiment. The rectifying homographies used for the rectification in step 46 may have been, for example, determined in step 42.

In a step 48, for each camera pair, a disparity estimation is performed. As explained above, the disparity estimations are performed independent from each other. As also explained above, the outcome of step 48 is at least one disparity map for each camera pair such as, for example, related to the view of one of the cameras of the respective camera pair, i.e. in form of a disparity map comprising a disparity value per pixel of the potentially rectified image of the respective camera of the respective camera pair. The disparity estimation is a search for mutually corresponding picture content in both images of the respective view pair, which are offset relative to each other due to the baseline offset between the cameras of this view pair.

As outlined above, however, step 48 may actually comprise the generation of two different disparity estimations per camera pair in a sub-step 48a using, for example, a different one of the cameras of the respective camera pair as a basis/reference for disparity estimation. For example, for pixel positions of the reference view, the disparity offset is searched for, which yields the maximum correlation with the image content in the non-reference view. After having performed this, the role of "reference view" and "non-reference view" is switched. In a subsequent sub-step 48b, a reliability measure may then be determined in a sub-step 48b for each camera pair, for one or both of the disparity estimations determined for the respective camera pair in sub-step 48a. The outcome of step 48b is a reliability map which associates with each disparity sample of the respective disparity map of sub-step 48a a reliability value which is determined in the following way: the disparity map subject to reliability determination of a first view is scanned; the disparity value at a currently visited sample position (x, y) of the first disparity map generated in sub-step 48a for a certain camera pair and generated with respect to the first camera/view of this pair, is used to locate a corresponding position in the other (second) view of the other (second) camera of this pair. The disparity map generated in the sub-step 48a for the same camera pair but with respect to the second view, is sampled at the located corresponding position so as to obtain a disparity value of the second disparity map. The latter disparity value plus the disparity value of the first disparity map is subject to absolute value computation so as to obtain the reliability value for position (x, y) for the first disparity map. Please note that both disparity values should, in the ideal case, be of equal magnitude but opposite direction/sign, and accordingly, the reliability values are a measure for the reliability of the disparity values of the first view with lower reliability values indicating higher reliability.

Then, in a following step 50, the disparity estimations or disparity maps estimated in step 48 for the different camera pairs are compared pair-wise to obtain a reliability estimation for one or both of each of these disparity estimation pairs. Imagine, for example, a first pair of cameras 51 and a second pair of cameras 53. As explained above, both pairs 51 and 53 may have one camera in common. FIG. 8, where these pairs are exemplarily shown, illustrates an example for the disparity estimation comparison step 50 leading, in the end, to the reliability estimation. Registered with each camera 2 of the camera pairs 51 and 53, FIG. 8 shows the pair of images 6 resulting from the cameras 2 capturing a common scene. As illustrated by a dashed arrow 46, pairs of registered images 52 may be obtained from images 6. Then, a disparity estimation generation 48 may result in depth/disparity maps 54, namely at least one for each camera pair 51 and 53. In accordance with the examples outlined above, the depth/disparity map estimations 54 may be related to the views of images 52/6 and cameras 2, respectively.

Imagine, the depth/disparity map estimate 54a was compared to depth/disparity map estimate 54b. To do this, sample positions (x,y) in depth/disparity map estimate 54a are scanned/sequentially visited and subject to the following processing: Using the disparity value at the current sample position (x,y) in the depth/disparity map estimate 54a, a 3D real point 56 in system 5, for example, (see FIG. 1) is determined. The determination which is illustrated by arrow 58, not only uses the depth value at (x,y) within depth/disparity map estimate 54a, but also the projection parameters of the corresponding camera and, if rectified, the rectifying homographies. This 3D point 56 is then projected onto the image plane of depth/disparity map estimate 54b with the protection indicated by arrow 60 and being performed using the projection parameters and, if present, the rectifying homographies associated with the respective camera of the respective camera pair 53. The position in the depth/disparity map estimate 54b, i.e. (x',y'), onto which the 3D point 56 is projected, is used to derive the corresponding disparity value of the depth/disparity map estimate 54b at that position. Using this disparity value, another 3D point 62 is determined again with the determination being illustrated by arrow 62 and using the projection parameters, the rectifying homography (if present) of the camera corresponding to the view which the depth/disparity map estimate 54b relates to, and the disparity value of the depth/disparity map estimate 54b at position (x',y'). Projecting the latter 3D point 62 to the image plane of the first depth/disparity map estimate 54a using the projection parameters and, if present, the rectifying homography of the corresponding camera associated with a view which the depth/disparity map estimate 54a relates to, results in a position (x",y"). A distance measure for a distance between points (x, y) and (x", y") in the image plane of the depth/disparity map estimate 54a may serve as a measure of the reliability of the depth/disparity value at position (x,y) of the depth/disparity map estimate 54a. In this manner, a reliability value may be obtained for each sample position of the depth/disparity map estimate 54a. Reversing the procedure, results in corresponding reliability values for the sample positions of the depth/disparity map estimate map estimate 54b, if needed.

As outlined above, the detour via the 3D world points 56 and 62, respectively, may be avoided. Rather, the disparity value at position (x, y) of depth/disparity map estimate 54a may be used directly in order to locate position (x',y') by concurrently using the projection parameters of the camera corresponding to 54a and the projection parameters corresponding to estimate 54b and, if present, the respective homographies. In the reverse direction, the detour may be avoided in the same manner. That is, the disparity value at the directly accessed point (x', y') may be used in order to locate position (x", y") by concurrently using the aforementioned prediction parameters and homographies.

With or without the detour, the determination of (x', y') from position (x, y) is summarized by the term "warping" just as the reverse determination of (x", y") on the basis of (x', y') is.

Back to FIG. 7, the result of step 50 is a reliability estimate for any of the disparity estimates generated at step 48. For sake of completeness, FIG. 7 shows that, optionally, in a step 66, the reliability as determined in step 50 and 48b, may be combined. Reference is made again to FIG. 8. Step 50 resulted in a reliability value per sample position for the depth/disparity map estimate 54a. In the same manner, optional step 48b, results in a reliability value per sample position of depth/disparity map estimate 54a, too. Accordingly, in step 66, per sample position, the respective reliability values for a respective sample position may be combined such as using a weighted sum or some other combination for which possibilities have been mentioned above.

Finally, the resulting reliabilities obtained for the depth/disparity map estimates may be used in order to steer subsequent processing steps in, for example, renderer 26 or post-processor 30 shown in FIG. 6. For example, the filter strength for filtering the respective depth/disparity map estimates may be controlled according to the reliability at the respective position. In the view synthesis performed by renderer 26, the reliabilities for the views corresponding to depth/disparity map estimates 54a and 54b may be used, for example, in order to steer the view synthesis process. Imagine, for example, renderer 26 would synthesize a view from these views. In this case, some sample positions in the image of the synthesized view would be synthesizable from both of these views. The depth/disparity map estimate 54a, for example, suggests that a first sample position in this view corresponds to the sample position in the synthesized view, and in the same manner, the depth/disparity map estimate 54b suggests that a second position within the view of estimate 54b also corresponds to this sample position of the synthesized view. The renderer 26, however, would synthesize the synthesized view at that pixel position of the synthesized view using the image value at the first position of the view of estimate 54a or the second position within the view of estimate 54b, with the selection between both being performed depending on the associated reliability value. If the reliability value of the first position is higher than the reliability value of the second position for estimate 54b, then the position in question of the synthesized view is synthesized from the view corresponding to estimate 54a, and if the reliability value of the second position for estimate 54b is higher than the reliability value of the first position for estimate 54a, then the position in question of the synthesized view is synthesized from the view corresponding to estimate 54b.

The embodiments described above yield a reliability measure of disparity maps that have been estimated in arbitrary multi-view environments. The embodiments described above use additional cameras to generate a reliability measure. Same exploit the trifocal constraint in a new way by comparing results of several completely independent disparity estimations with optionally aggregating it with multiple additional reliability measures. The embodiments do not depend on a particular disparity estimation algorithm. Even though the embodiments use three cameras same can also be used with only two cameras or for special applications with more than three cameras. It is worthwhile to note that the information provided by additional cameras is not used implicitly in the disparity estimation to directly compute a better result but deliberately sticking to pure stereo pairs for the disparity estimation and keeping the different estimations completely independent. The different results are then compared leading to multiple or a single reliability measure. The embodiments are not restricted to a special setup and do not aim in fusing all information to a single representation but compute reliabilities for one or more or all estimations. The embodiments, thus, yield a multifocal reliability enhancement for disparity estimation.

As a precautionary measure only it is noted that the embodiments for depth map generation presented above could alternatively be used for any depth related prost-production applications, as for instance depth keying or depth-of-field adjustments.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] Kanade, T.; Yoshida, A.; Oda, K.; Kano, H.; Tanaka, M.; "A stereo machine for video-rate dense depth mapping and its new applications", Proc. CVPR, IEEE Computer Society Conference on, 1996, p. 196-202
[2] US2003/0072483, G. Q. Chen, "Method and apparatus for recovering depth using multi-plane stereo and spatial propagation"
[3] Mulligan, J.; Isler, V.; Daniilidis, K.; "Trinocular Stereo: A Real-Time Algorithm and its Evaluation", Proc. IEEE Workshop on Stereo and Multi-Baseline Vision (SMBV), 2001, pp. 10.
[4] US2006/0056727, G. R. Jones and M. Hansard, "System for combining multiple disparity maps"

The invention claimed is:

1. Disparity map generator comprising:
   a first pair of signal interfaces that receives picture signals of a first pair of views of a scene;
   a second pair of signal interfaces that receives picture signals of a second pair of views of the scene;
   a generator that receives the picture signals of the first and second pairs of views from the first and second pairs of signal interfaces and generates, independent from each other, a first depth/disparity map estimate between the first pair of views and a second depth/disparity map estimate between the second pair of views, wherein the first and second pair of views are different from each other;
   a comparator that receives the first and second depth/disparity map estimates from the generator and compares the first depth/disparity map estimate and the second depth/disparity map estimate to acquire a reliability measure for the first depth/disparity map estimate and/or the second depth/disparity map estimate; and
   an output interface that outputs the reliability measure and the first depth/disparity map estimate and/or second depth/disparity map estimate for which the reliability measure is acquired;
   wherein, according to the generator, the first depth/disparity map estimate relates to a first view comprised by the first pair of views, and the second depth disparity map estimate relates to a second view comprised by the second pair of views,
   wherein the comparator:
      warps samples of the first depth/disparity map estimate to the second view;
      samples the second depth/disparity map estimate at locations to which samples of the first depth/disparity map estimate are warped;
      re-warps the locations into the first view using the second depth/disparity map estimate sampled at the locations; and
      uses a distance between positions of the samples of the first depth/disparity map estimate and the re-warped locations as the reliability measure for the first depth/disparity map estimate;
   wherein at least one of the generator and the comparator is implemented on a microprocessor, a programmed computer, or an electronic circuit.

2. Disparity map generator according to claim 1, wherein, according to the generator, the first and second pairs of views share a predetermined view, the first pair of views comprising the predetermined view and the first view and the second pair of views comprising the predetermined view and the second view, wherein the first view, the second view and the predetermined view obey a trifocal constraint, and the comparator compares the first depth/disparity map estimate and the second depth/disparity map estimate using the trifocal constraint.

3. Disparity map generator according to claim 1, wherein, according to the comparator, in comparing the first and second depth/disparity map estimates, warp samples of the first depth/disparity map estimate and/or the second depth/disparity map estimate into a common view.

4. Disparity map generator according to claim 3, wherein:
   according to the generator, the first depth/disparity map estimate relates to the first view comprised by the first pair of views, and the second depth/disparity map estimate relates to the second view comprised by the second pair of views, and
   according to the comparator, the common view is either the first view or the second view.

5. Disparity map generator according to claim 1, further comprising
   a post-processor that filters the first and/or the second depth/disparity map estimate using the reliability measure for the first and/or the second depth/disparity map estimate.

6. Disparity map generator according to claim 1, wherein the generator rectifies the first and second pairs of views, respectively, to obtain a rectified version of the first and second pairs of views and generates the first depth/disparity map estimate and the second depth/disparity map estimate using the rectified version.

7. Disparity map generator according to claim 1, wherein the generator generates the first depth/disparity map estimate and the second depth/disparity map estimate by finding corresponding portions showing one content of the scene from different perspective, in the first pair of views and in the second pair of views, individually.

8. Disparity map generator comprising:
   a first pair of signal interfaces that receives picture signals of a first pair of views of a scene;
   a second pair of signal interfaces that receives picture signals of a second pair of views of the scene;
   a generator that receives the picture signals of the first and second pairs of views from the first and second pairs of signal interfaces and generates, independent from each other, a first depth/disparity map estimate between the first pair of views and a second depth/disparity map estimate between the second pair of views, wherein the first and second pair of views are different from each other;
   a comparator that receives the first and second depth/disparity map estimates from the generator and compares the first depth disparity map estimate and the second depth disparity map estimate to acquire a reliability measure for the first depth/disparity map estimate and/or the second depth/disparity map estimate; and an output interface that outputs the reliability measure and the first depth/disparity map estimate and/or second depth/disparity map estimate for which the reliability measure is acquired;

wherein the generator:
  generates the first depth/disparity map estimate so that same relates to a first view of the first pair of views, and also generates a third depth/disparity map estimate relating to a third view comprised by the first pair of views and differing from the first view, and
  generates the second depth/disparity map estimate so that same relates to a second view of the first pair of views, and also generates a fourth depth/disparity map estimate relating to a fourth view comprised by the second pair of views and differing from the second view, the third and fourth views are generated independent from each other,
wherein the comparator compares the first and third depth/disparity map estimates to acquire an intra-pair reliability measure and to determine the reliability measure also based on the intra-pair reliability measure; and
wherein at least one of the generator and the comparator is implemented on a microprocessor, a programmed computer or an electronic circuit.

9. Disparity map generator according to claim 8, wherein the generator, in generating the first and second views, uses different image processing directions.

10. Disparity map generator according to claim 8, wherein the comparator, in comparing the first and third depth/disparity map estimates, warps the third depth/disparity map estimate to the first view and derive the intra-pair reliability measure from a deviation of the warped third depth/disparity map estimate from the first depth/disparity map estimate.

11. Disparity map generator according to claim 8, wherein the comparator determines the reliability measure by a sample-wise combination of the intra-pair reliability measure and an inter-pair reliability measure as acquired by comparing the first depth/disparity map estimate and the second depth/disparity map estimate.

12. Apparatus for Depth Image Based Rendering (DIBR) generation of a virtual view, comprising:
  a disparity map generator including:
    a first pair of signal interfaces that receives picture signals of a first pair of views of a scene;
    a second pair of signal interfaces that receives picture signals of a second pair of views of the scene;
    a generator that receives the picture signals of the first and second pairs of views from the first and second pairs of signal interfaces and generates, independent from each other, a first depth/disparity map estimate between the first pair of views and a second depth/disparity map estimate between the second pair of views, wherein the first and second pair of views are different from each other; and
    a comparator that receives the first and second depth/disparity map estimates from the generator and compares the first depth/disparity map estimate and the second depth/disparity map estimate to acquire a reliability measure for the first depth/disparity map estimate and/or the second depth/disparity map estimate, and
    an output interface that outputs the reliability measure and the first depth/disparity map estimate and/or second depth/disparity map estimate for which the reliability measure is acquired,
  wherein, according to the generator, the first depth/disparity map estimate relates to a first view comprised by the first pair of views, and the second depth/disparity map estimate relates to a second view comprised by the second pair of views,
  wherein the comparator:
    warps samples of the first depth/disparity map estimate to the second view,
    samples the second depth/disparity map estimate at locations to which samples of the first depth/disparity map estimate are warped,
    re-warps the locations into the first view using the second depth/disparity map estimate sampled at the locations, and
    uses a distance between positions of the samples of the first depth/disparity map estimate and the re-warped locations as the reliability measure for the first depth/disparity map estimate;
  a virtual view output; and
  a DIBR renderer that receives the first and/or second depth/disparity map estimate along with the reliability measure thereof from the output interface and uses the first and/or second depth/disparity map estimate along with the reliability measure thereof, to render a virtual view;
  wherein at least one of the disparity map generator and the DIBR renderer is implemented on a microprocessor, a programmed computer or an electronic circuit.

13. Disparity map generation method comprising:
  receiving, at a first pair of signal interfaces, picture signals of a first pair of views of a scene;
  receiving, at a second pair of signal interfaces, picture signals of a second pair of views of the scene;
  generating, by a generator and independent from each other, a first depth/disparity map estimate between the first pair of views and a second depth/disparity map estimate between the second pair of views, wherein the first and second pair of views are different from each other; and
  comparing, by a comparator, the first depth/disparity map estimate and the second depth/disparity map estimate to acquire a reliability measure for the first depth/disparity map estimate and/or the second depth/disparity map estimate;
  wherein the generating is performed such that the first depth disparity map estimate relates to a first view comprised by the first pair of views, and the second depth/disparity map estimate relates to a second view comprised by the second pair of views, wherein the comparing includes:
    warping samples of the first depth/disparity map estimate to the second view;
    sampling the second depth/disparity map estimate at locations to which samples of the first depth/disparity map estimate are warped;
    re-warping the locations into the first view using the second depth disparity map estimate sampled at the locations; and
    using a distance between positions of the samples of the first depth/disparity map estimate and the re-warped locations as the reliability measure for the first depth/disparity map estimate; and
  wherein at least one of the generator and the comparator is implemented on a microprocessor, a programmed computer, or an electronic circuit.

14. A non-transitory computer readable storage medium including a computer program comprising a program code for performing, when running on a computer, a method comprising:
  generating, independent from each other, a first depth/disparity map estimate between a first pair of views and a second depth/disparity map estimate between a second pair of views, wherein the first and second pair of views are different from each other; and
  comparing the first depth/disparity map estimate and the second depth/disparity map estimate to acquire a reliability measure for the first depth/disparity map estimate and/or the second depth/disparity map estimate,
  wherein the generating is performed such that the first depth disparity map estimate relates to a first view comprised by the first pair of views, and the second depth disparity map estimate relates to a second view comprised by the second pair of views,
  wherein the comparing includes:
    warping samples of the first depth/disparity map estimate to the second view,
    sampling the second depth/disparity map estimate at locations to which samples of the first depth/disparity map estimate are warped,
    re-warping the locations into the first view using the second depth/disparity map estimate sampled at the locations, and
    using a distance between positions of the samples of the first depth/disparity map estimate and the re-warped locations as the reliability measure for the first depth/disparity map estimate.

15. Apparatus for DIBR generation of a virtual view, comprising
  a disparity map generator including:
    a first pair of signal interfaces that receives picture signals of a first pair of views of a scene;
    a second pair of signal interfaces that receives picture signals of a second pair of views of the scene;
    a generator that receives the picture signals of the first and second pairs of views from the first and second pairs of signal interfaces and generates, independent from each other, a first depth/disparity map estimate between the first pair of views and a second depth/disparity map estimate between the second pair of views, wherein the first and second pair of views are different from each other;
    a comparator that receives the first and second depth/disparity map estimates from the generator and compares the first depth/disparity map estimate and the second depth/disparity map estimate to acquire a reliability measure for the first depth/disparity map estimate and/or the second depth/disparity map estimate; and
    an output interface that outputs the reliability measure and the first depth/disparity map estimate and/or second depth/disparity map estimate for which the reliability measure is acquired;
  wherein the generator:
    generates the first depth/disparity map estimate so that same relates to a first view of the first pair of views, and also generates a third depth/disparity map estimate relating to a third view comprised by the first pair of views and differing from the first view, and
    generates the second depth/disparity map estimate so that same relates to a second view of the first pair of views, and also generates a fourth depth/disparity map estimate relating to a fourth view comprised by the second pair of views and differing from the second view, the third and fourth views are generated independent from each other,
  wherein the comparator compares the first and third depth/disparity map estimates to acquire an intra-pair reliability measure and to determine the reliability measure also based on the intra-pair reliability measure;
  a virtual view output; and
  a DIBR renderer that receives the first and/or second depth/disparity map estimate along with the reliability measure thereof from the output interface and uses the first and/or second depth/disparity map estimate along with the reliability measure thereof, to render a virtual view, and output the virtual view at the virtual view output,
  wherein at least one of the disparity map generator and the DIBR renderer is implemented on a microprocessor, a programmed computer or an electronic circuit.

16. Disparity map generation method comprising
  receiving, at a first pair of signal interfaces, picture signals of a first pair of views of a scene;
  receiving, at a second pair of signal interfaces, picture signals of a second pair of views of the scene;
  generating, by a generator and independent from each other, a first depth/disparity map estimate between the first pair of views and a second depth/disparity map estimate between the second pair of views, wherein the first and second pair of views are different from each other; and
  comparing, by a comparator, the first depth/disparity map estimate and the second depth/disparity map estimate to acquire a reliability measure for the first depth/disparity map estimate and/or the second depth/disparity map estimate, and
  wherein the generating includes:
    generating the first depth/disparity map estimate so that same relates to a first view of the first pair of views, and also generating a third depth/disparity map estimate relating to a third view comprised by the first pair of views and differing from the first view, and
    generating the second depth/disparity map estimate so that same relates to a second view of the first pair of views, and also generating a fourth depth/disparity map estimate relating to a fourth view comprised by the second pair of views and differing from the second view, the third and fourth views are generated independent from each other,
  wherein the comparing comprises comparing the first and third depth/disparity map estimates to acquire an intra-pair reliability measure and to determine the reliability measure also based on the intra-pair reliability measure,
  wherein at least one of the generator and the comparator is implemented on a microprocessor, a programmed computer or an electronic circuit.

17. A non-transitory computer-readable storage medium storing a computer program comprising a program code for performing, when running on a computer, a disparity map generation method comprising:
  generating, independent from each other, a first depth/disparity map estimate between a first pair of views and a second depth/disparity map estimate between a second pair of views, wherein the first and second pair of views are different from each other; and comparing the first depth/disparity map estimate and the second depth/disparity map estimate to acquire a reliability measure for the first depth/disparity map estimate and/or the second depth/disparity map estimate, wherein the generating includes:
  generating the first depth/disparity map estimate so that same relates to a first view of the first pair of views, and also generating a third depth/disparity map estimate relating to a third view comprised by the first pair of views and differing from the first view, and
  generating the second depth/disparity map estimate so that same relates to a second view of the first pair of views, and also generating a fourth depth/disparity map estimate relating to a fourth view comprised by the second pair of views and differing from the second view, the third and fourth views are generated independent from each other, wherein the comparing comprises comparing the first and third depth/disparity map estimates to acquire an intra-pair reliability measure and to determine the reliability measure also based on the intra-pair reliability measure.

* * * * *